United States Patent
Weber

(10) Patent No.: US 10,093,127 B2
(45) Date of Patent: Oct. 9, 2018

(54) WHEEL AND METHOD FOR DRIVING A WHEEL

(71) Applicant: SAF-HOLLAND GmbH, Bessenbach (DE)

(72) Inventor: Karsten Weber, Aschaffenburg (DE)

(73) Assignee: SAF-HOLLAND GmbH, Bessenbach (DE)

(*) Notice: Subject to any disclaimer, the term of this patent is extended or adjusted under 35 U.S.C. 154(b) by 167 days.

(21) Appl. No.: 15/310,339

(22) PCT Filed: May 5, 2015

(86) PCT No.: PCT/EP2015/059799
§ 371 (c)(1),
(2) Date: Nov. 10, 2016

(87) PCT Pub. No.: WO2015/173065
PCT Pub. Date: Nov. 19, 2015

(65) Prior Publication Data
US 2017/0151830 A1    Jun. 1, 2017

(30) Foreign Application Priority Data
May 16, 2014   (DE) .................. 10 2014 209 310

(51) Int. Cl.
| | |
|---|---|
| *B60B 19/00* | (2006.01) |
| *B60B 9/28* | (2006.01) |
| *B60B 9/18* | (2006.01) |

(52) U.S. Cl.
CPC .............. *B60B 19/00* (2013.01); *B60B 9/18* (2013.01); *B60B 9/28* (2013.01)

(58) Field of Classification Search
CPC .. B60B 19/00; B60B 9/18; B60B 9/26; B60B 9/28
USPC ........................... 152/17, 29, 30, 40, 44, 53
See application file for complete search history.

(56) References Cited

U.S. PATENT DOCUMENTS

| | | | | |
|---|---|---|---|---|
| 574,200 | A | * 12/1896 | Goddard | ............... B62D 57/00 180/8.7 |
| 1,759,833 | A | 5/1930 | Bardwell | |
| 3,672,458 | A | 6/1972 | Mackerle | |

(Continued)

FOREIGN PATENT DOCUMENTS

| | | |
|---|---|---|
| DE | 1430372 | 3/1969 |
| DE | 2004055 | 1/1971 |
| DE | 19957373 | 5/2001 |

(Continued)

OTHER PUBLICATIONS

European Patent Office; International Search Report; dated Jul. 9, 2015.

*Primary Examiner* — S. Joseph Morano
*Assistant Examiner* — Jean W Charleston
(74) *Attorney, Agent, or Firm* — Price Heneveld LLP

(57) ABSTRACT

A wheel includes an outer wheel ring, a hub at least one support device supporting the outer wheel ring on the hub, and an adjustment device configured to adjust the hub relative to the outer wheel ring, wherein the support device has multiple support elements which extend between the hub and the wheel ring, and wherein the support elements are arranged three-dimensionally such that the hub can be adjusted in five degrees of freedom relative to the outer wheel ring.

22 Claims, 3 Drawing Sheets

(56) References Cited

U.S. PATENT DOCUMENTS

| | | | | |
|---|---|---|---|---|
| 5,672,458 A | * | 9/1997 | Tutt | B41M 5/24 |
| | | | | 427/485 |
| 2011/0126948 A1 | * | 6/2011 | Boyer | B60B 9/04 |
| | | | | 152/40 |

FOREIGN PATENT DOCUMENTS

| | | |
|---|---|---|
| GB | 2118496 | 11/1983 |
| RU | 2180886 | 3/2002 |

* cited by examiner

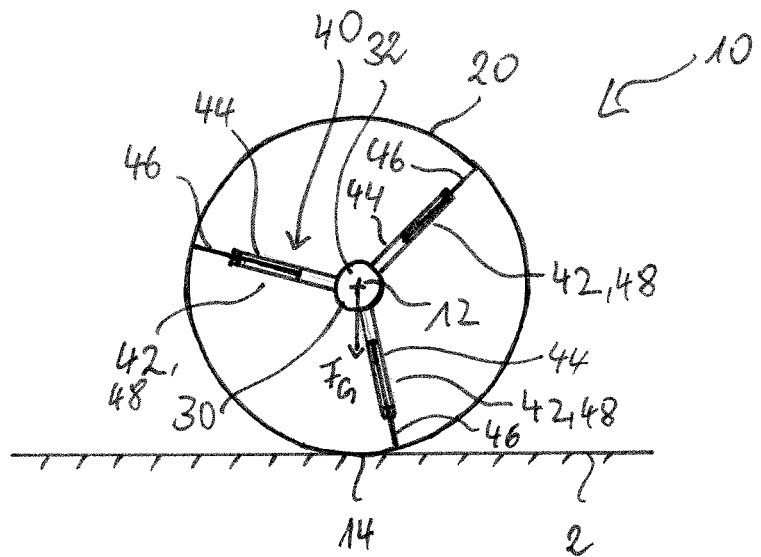
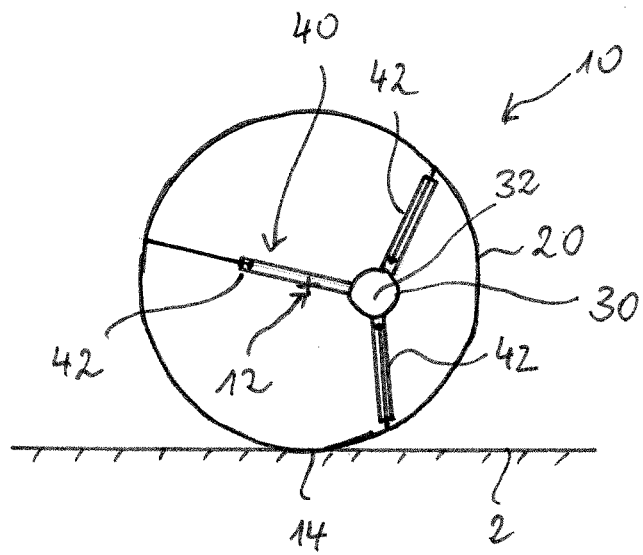

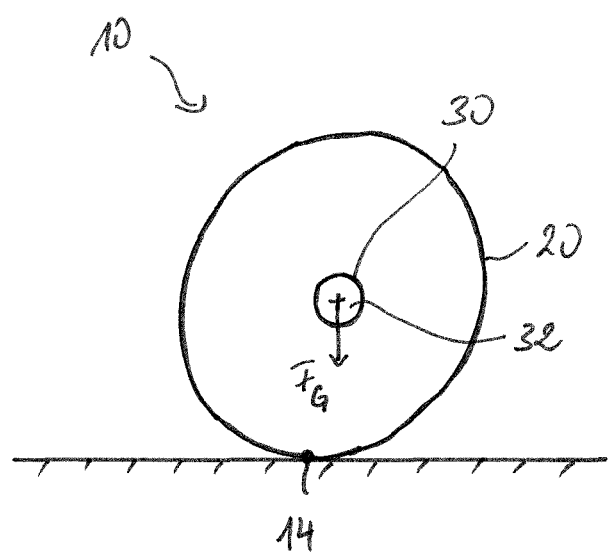

WHEEL AND METHOD FOR DRIVING A WHEEL

BACKGROUND OF THE INVENTION

The invention relates to a wheel, having an outer wheel ring, a hub, and at least one support device by way of which the outer wheel ring is supported on the hub. The invention also relates to a method for driving a wheel of said type in rotation.

For driving a wheel, internal combustion engines or electric motors, for example, are known. The transmission of the power from the engine or motor to the wheel is realized by way of so-called drivetrains, for example a gearbox with shafts, chains, belts or the like. Hydraulically or pneumatically operating motors are also used in the prior art. It is also known for muscle power, wind power or a downhill-slope force to be used for driving a wheel.

Suspension and steering are normally realized by way of movable and/or pivotable mounts, which are thus not rigidly connected to the vehicle, for the rotatably mounted hub of the wheel.

Braking is generally effected, in the case of internal combustion engines, through the conversion of kinetic energy into heat with the aid of brake discs or drums and friction pads. In the case of electric motors being used, the braking is realized in part by way of a reversal of the power flow, and thus the recovery of electrical energy (recuperation). Furthermore, other methods for recovering energy are known, for example compressors or retarders.

The invention is based on the object of providing a wheel and a method for driving a wheel, which wheel and method make it possible to realize an alternative drive action.

SUMMARY OF THE INVENTION

The wheel according to the invention is characterized in that an adjustment device (an adjustment mechanism) is provided by way of which the hub is adjustable relative to the outer wheel ring, in particular in continuous fashion, in particular during a rotation of the wheel.

The method according to the invention for driving a wheel in rotation is characterized in that the hub is adjusted relative to the outer wheel ring, in particular in continuous fashion, for the purposes of driving the wheel in rotation.

A basic concept of the invention consists in the hub not being rigidly connected to the wheel ring but rather being adjustable relative to the outer wheel ring in different directions. For this purpose, an adjustment mechanism or an adjustment device is provided which actively moves the hub relative to the outer wheel ring, in particular in different radial directions. The outer wheel ring is preferably a wheel rim, possibly with a tire. The wheel ring has an outer tread surface, which may be formed for example by the wheel rim itself or by the tire. The adjustment device is preferably a part of the support device which supports the outer wheel ring on the hub. The adjustment device is thus preferably arranged between the hub and the outer wheel ring. By way of the adjustment device, the hub is actively displaced relative to the outer wheel ring, and/or the outer wheel ring is actively moved relative to the hub, in particular in order to effect a rotation of the wheel by way of said displacement or movement. The adjustment device is thus designed to generate a force between the hub and the wheel ring, by means of which force a deflection of the hub and/or of the wheel ring (or of a part thereof) can be realized. The force that acts between hub and wheel ring can be used for driving the wheel in rotation. The adjustment device acts on the support elements and may also be formed as part of the support elements.

In a preferred embodiment, it is provided that the adjustment device is designed to deflect the hub, in particular in continuous fashion, in different, in particular radial directions out of a geometrical center of the wheel, in particular during the rotation of the wheel. By way of the deflection out of the geometrical center, it is the case, in particular if the deflection takes place obliquely with respect to a force acting on the wheel, a lever force is generated which effects a rotation of the wheel. For the continuous drive of the wheel, the hub may then be moved in continuous fashion in different radial directions, such that the lever force acts continuously. The adjustment device is preferably designed both to move the hub in different radial directions relative to the wheel ring and to adjust the hub in continuously variable fashion to different extents (distances) in the radial direction. The geometrical center is preferably the geometrical central point or the geometrical center of gravity, in particular in relation to the area of the wheel running transversely with respect to the wheel axis. In the case of a circular wheel, this is the circle central point. Mathematically, the center of gravity or central point can be determined by averaging all of the points of the wheel area delimited by the wheel ring.

The adjustment device is preferably designed to move the hub along an orbital path about a geometrical center of the outer wheel ring. The adjustment device is preferably designed, in the static coordinate system of the rotating wheel, to generate a movement of the hub along a circular path about the geometrical center.

In a further preferred embodiment, the support device has multiple, preferably at least three, support elements which extend between the hub and the wheel ring. The adjustment device is preferably designed to vary the length of the support elements between the hub and the wheel ring. It is particularly preferable if the adjustment device itself also supports the wheel ring on the hub, or at least contributes to the support, and can thus be regarded as a part of the support device. Accordingly, it is preferable for the support elements to each comprise the adjustment device, wherein the adjustment device is designed for adjusting the length of the support elements between the hub and the wheel ring. Here, the support elements can preferably be in each case individually actuated, such that, within a certain region of the wheel plane, it is possible to set any desired position of the hub in the plane of the wheel. Thus, through variation of the length of the individual support elements, the hub can be displaced or adjusted in any desired manner, in particular in continuously variable fashion, in a certain region in the plane of the wheel.

By way of the support elements (for example spokes and/or struts) which are adjustable in length in this way, the hub can be targetedly and actively deflected out of the geometrical center of the wheel, such that, in interaction with a force acting on the wheel (for example the weight force of a vehicle), a torque is generated on the wheel. The adjustment device may for example be in the form of a telescopic device. For example, telescopable struts or spokes may be provided which can be retracted and extended by way of a stroke-performing cylinder. However, basically any other desired embodiments are conceivable which can move the hub in the wheel plane by way of a variation of the length of the support elements. For example, it is possible for webs or spokes of variable shape to be arranged between the hub and the wheel ring, wherein the shape can be actively varied such that the hub is moved relative to the wheel ring.

The adjustment device may for example be electromechanically and/or hydraulically and/or pneumatically operated. It is essential not only that pure suspension or resilient mounting of the hub is provided but also that the hub can be actively moved relative to the wheel ring (or vice versa). For example, for this purpose, the spokes of the wheel may comprise electromechanically, hydraulically and/or pneumatically operated stroke-performing cylinders. The electromechanically, hydraulically and/or pneumatically operated adjustment device serves for the adjustment, in particular length and/or shape adjustment, of the support elements.

In a further preferred embodiment, the support device has multiple, preferably at least three, deformable support elements which extend between the hub and the wheel ring. The deformable, in particular elastic support elements permit a relative movement between hub and wheel ring. For the active adjustment of the hub, the adjustment device is preferably designed to adjust the shape and/or the elasticity and/or the preload of the support elements, in particular independently of one another. It is thus possible for the shape and/or the elasticity and/or preload of each individual support element to be individually varied, such that, for example by way of different elasticities of the individual support elements, a displacement of the hub relative to the wheel ring can be effected. For this purpose, it is for example the case that a first support element pushes the hub more intensely toward the opposite side of the wheel ring than a second support element. Through continuous variation of the shapes, elasticities and/or preload of the support element, it is possible to generate a "traveling movement" of the hub within the wheel ring.

In a preferred embodiment, the wheel ring is a, in the technical sense, dimensionally stable or rigid ring. Provision is thus not made for the shape of the wheel ring to change significantly. Here, small deformations owing to acting loads (for example the weight force of a vehicle) are self-evidently not ruled out. Said wheel ring may thus be a wheel rim such as is basically known, for example of a vehicle or of a bicycle. Here, it is preferable if the adjustment device is designed to adjust the position of the hub while maintaining the shape of the wheel ring. The hub is thus moved within the dimensionally stable wheel ring. For this purpose, it is for example the case that the support elements (spokes, webs or the like) are adjusted or adapted in controlled fashion such that, although a movement of the hub takes place, a deformation of the wheel ring does not occur as a result of the adjustment of the support elements.

In a further preferred embodiment, it may be provided that the adjustment device is designed to deform the outer wheel ring, preferably in continuous fashion, during the rotation of the wheel. This may be realized actively by way of the adjustment mechanism or the adjustment device by virtue, for example, of a more intense shortening of the distance between hub and corresponding wheel circumference being realized in a first transverse direction (first diameter direction, first semi-axis) than in a second transverse direction (second diameter direction, second semi-axis). In this way, it is for example possible for a deformation of the wheel ring to be realized such that the outer wheel ring is moved on an oval, in particular elliptical orbital path about a central axis. It is thus preferably the case that a local deformation of the wheel ring occurs, which varies along the circumference. It is basically also possible for the deformation to take place independently of the support elements between hub and wheel ring, for example by way of a deformation of a tire arranged on a wheel rim. For this purpose, corresponding deformation elements may be arranged in the tire.

As a result of the deformation of the wheel ring (wheel rim and/or tire), it is possible for the tread surface to adapt for example to the shape or contour of an underlying surface on which the wheel rolls. It is thus possible, for example, for unevennesses (for example curbs, steps etc.) to be negotiated more easily. For this purpose, it is possible for a local indentation to be actively realized in the region of an obstruction to be negotiated, for example in the region of an edge or step that is to be negotiated.

According to the invention, it is particularly preferable for a control device to be provided by way of which the adjustment mechanism for the adjustment device can be controlled for the purposes of driving the wheel in rotation. The control device is preferably designed to adjust the hub in continuous fashion in the plane of the wheel and/or to continuously vary the contour of the wheel ring. The relative movement between hub and wheel ring is preferably realized such that a force acting on the hub (for example the weight force of a vehicle) effects a rotation of the wheel.

The wheel according to the invention may also be referred to as an active wheel or a wheel with an installed drive mechanism, wherein the drive mechanism is a part of the wheel which rotates together with the wheel. The wheel is thus driven in rotation by virtue of the hub being adjusted relative to the wheel ring and/or by virtue of the wheel ring being locally deformed. In this way, a lever force is generated which effects a rotation of the wheel. Hub and wheel ring are thus adjusted relative to one another such that the wheel is driven in rotation owing to a lever force that acts on the hub. Here, it is preferable for the hub to be actively moved along an orbital path about a geometrical center of the wheel ring. Alternatively or in addition, the wheel ring may, for the purposes of driving delimitation, be continuously deformed, in particular such that the wheel ring is moved on an oval orbital path about the hub.

The adjustment device for the adjustment of hub and wheel ring relative to one another, and/or for the deformation of the wheel ring, thus constitutes a drive device for the wheel. The drive is realized by way of an active deflection of the hub out of the geometrical center point of the wheel and/or an active deformation of the wheel ring such that the force acting on the hub runs obliquely with respect to the connecting line between hub and ground contact point of the wheel.

The invention may also be described as follows:

The wheel comprises a wheel rim situated on the outer radius, possibly with a tire, or a toothed ring or a belt pulley (outer element, wheel ring). Said wheel rim is preferably circular and rigid, though may possibly also be elastic and variable in terms of its geometry. A hub (inner element) of the wheel is rotatably mounted on a shaft or axle. The hub is at least intermittently situated outside the geometrical center of the wheel. It is possible for devices or means to be provided for transmitting electrical, pneumatic or hydraulic energy from the preferably static shaft into the rotating hub or into the rotating wheel. Furthermore, a control device for controlling the transmitted energy may be provided.

Connecting elements, for example three or more spokes or webs or connecting elements of similar form, are provided between the hub (inner element) and the outer element. Said connecting elements may be arranged in one row or in multiple rows (in an axial direction). The connecting elements may furthermore be arranged in arcuate or criss-crossing fashion or in a scissor configuration (similarly to a lifting truck), and may also be designed in the form of spheres or cylinders. The connecting elements may, according to the invention, be either rigid or elastic.

An essential aspect of the invention consists in that the connecting elements are actuators or "active elements". The connecting elements may be rigid and (for example electromechanically, magnetically or hydraulically) variable in terms of their extent or their shape. Furthermore, the connecting elements may be elastic or (for example pneumatically, for example pneumatic muscles; or electrically: active elements such as piezo-metal composites) variable in terms of their preload and rigidity.

The connecting elements exert a force between the hub and the outer element, and thus effect a movement between these. By way of a continuous movement, the energy which is introduced into the connecting elements can be converted into propulsive power of the wheel. This is realized in particular by virtue of the hub being displaced, using the active elements, relative to the geometrical center of the outer element (wheel rim). Now, if a force, for example the weight force of a vehicle, acts downward on the wheel hub along the vertical, and a position of the hub has been displaced in the horizontal, a torque is generated, because the reaction point, in this case the ground contact point of the wheel, lies behind the hub center with the force action point. The vehicle is thus caused to roll. If the actuators (with a feed of energy) are actuated such that, in the coordinate system that does not co-rotate, the hub center always maintains the same position relative to the origin of the rotating coordinate system of the outer wheel or wheel element, said drive torque is maintained even as the wheel rotates, regardless of the speed thereof. A vehicle on a level plane will thus continuously "virtually roll downhill". In the co-rotating coordinate system of the wheel or of the outer wheel element (wheel ring), the hub would describe a circular path, but without itself rotating. In a reversal of the principle, that is to say a displacement of the wheel hub behind the ground contact point of the wheel, a deceleration is realized, wherein a recuperation of energy is also possible.

By way of corresponding three-dimensional arrangement of the support elements (active elements), for example 2×3 elements in two planes, it is possible for the hub to be adjusted relative to the rotating outer element in multiple, in particular five, degrees of freedom, whereby, in addition to the drive action, it is also possible to provide control of toe, camber, steering angle and/or to provide a form of suspension. With regard to the suspension, with corresponding control, "active" damping is also conceivable.

The further, sixth degree of freedom is the rotation about the axis of the shaft on which the hub is mounted. Said degree of freedom may basically also be controlled by way of a corresponding drive shaft or a motor. By way of the invention, however, this is no longer necessary for the drive of the wheel.

A basic prerequisite for the conversion of energy into movement is, in the case of the wheel according to the invention, a force which acts externally on the circumference of the wheel and which is not fully compensated by a reaction force of the hub (or vice versa), because the vectors of both forces do not point toward the same point or do not lie parallel, such that an additional torque or a further force is generated which may for example be the inertia force of a vehicle during acceleration or the friction force (wind and/or rolling resistance) of a vehicle during travel at high speed. In a usage situation on a vehicle, these would be the gravitational force of the mass acting on the axle or shaft, and the reaction force at the ground contact point of the wheel on the road. In a usage situation for driving a machine, said forces could for example originate from a belt or a chain which runs on the outer circumference, or else from a radial force by way of which a toothing is pressed against the outer circumference on a further toothed wheel.

In a usage situation as a running and drive wheel on a vehicle, the propulsive force (and thus the exhilaration) is proportionally dependent on the distance by which the hub center is adjusted relative to the wheel center (and thus the ground contact point of the wheel). Thus, the maximum drive force is limited to the value that can be achieved at maximum adjustment. The propulsive force is furthermore proportional to the weight force acting on the axle, such that, consequently, the achievable acceleration is independent of the state of load of the vehicle (assuming that the actuators/active elements are capable of imparting the correspondingly required forces). Furthermore, the achievable acceleration is constant across all rotational speed ranges of the wheel (assuming that the actuators/active elements are capable of realizing the energy throughput required for this purpose at the corresponding operating frequencies). It is however preferable for an upper utilizable rotational speed or operating frequency of the actuators to be defined, wherein this may for example be relatively high in the case of metal-piezoceramic elements.

In terms of characteristics, the drive concept according to the invention lies in a range between an electric motor (greatest torque at standstill, approximately constant power output across the utilizable rotational speed range) and an internal combustion engine (torque which increases with engine speed, and correspondingly steeply increasing power output).

The maximum force/acceleration is in particular dependent on the ratio of the maximum adjustment travel of the hub relative to the radius of the wheel, that is to say is independent of the wheel size. In the theoretical ideal case, the upper limit of the acceleration is 1 g (force max $M*1$ g).

The power output or the power conversion increases linearly with the rotational speed and with the accelerating mass (if this also acts on the wheel and not for example on a trailer with "passive wheels").

The outer contour of the wheel need not inevitably be rigid and circular. It may for example be provided that the entire outer contour of the wheel can be distorted in such a way that it takes on the appearance, for example, of an inclined ellipse, whereby a similar propulsion effect to that described above can be achieved. On the other hand, it would be possible for the outer contour of the wheel to be varied only locally, for example by way of corresponding active elements within the belt of a tire, such that the stress conditions for example in the contact patch of the tire are shifted such that the effective line of force is displaced in front of or behind the center of the wheel. In this way, it is for example possible for the rolling resistance of a tire to be compensated. The energy required for overcoming the rolling resistance is in this case introduced into the active elements in the belt of the tire. In this way, a system can be realized which, even under load and in the case of a relatively high level of flexibility of the tire, could be rolled back and forth without apparent friction. In a further preferred embodiment, it would be possible, by way of a sensor arrangement which scans the surroundings ahead, for the contour of a tire or wheel to be adapted in terms of shape to obstructions, such as for example steps or curbs, by way of active elements. Such obstructions could thus be negotiated without difficulty.

Furthermore, with corresponding actuation of the actuators, it would also be possible, from oscillating movements of the shaft/axle on which the hub runs and which is either rigidly connected or else movably connected to the vehicle or to the machine part, for energy to be transformed into drive or propulsion power.

By means of the invention, it is made possible for the functions of suspension, damping, steering, drive and/or recuperation to be unified in one system which is arranged, by way of actuators, between an outer wheel and/or tire/wheel rim and a rotatably mounted hub. Here, it is possible to dispense with further drives (such as for example an electric motor) in the system. For example, it is possible to provide a drive system which makes do entirely without rotating parts (aside from the rotary mounting of the hub).

The active elements or actuators may for example be realized by way of sickle-shaped spokes. The spokes may for example be composed of a spring steel which is coated on both sides with a piezoceramic, such that said spokes are capable of increasing or decreasing their bending radius in accordance with a voltage applied to the piezo elements.

BRIEF DESCRIPTION OF THE DRAWINGS

The invention will be described in more detail below on the basis of preferred embodiments which are illustrated in the appended schematic figures, in which:

FIG. 3 shows a second embodiment of a wheel according to the invention in a rest position;

FIG. 4 shows the wheel from FIG. 3 in a drive position; and

FIG. 5 shows a third embodiment of a wheel according to the invention.

DETAILED DESCRIPTION OF THE PREFERRED EMBODIMENTS

Identical components or components of identical action are denoted by the same reference designations throughout the figures. The features described on the basis of the individual figures or embodiments may also, where technically possible, be combined with one another.

Figure 1:
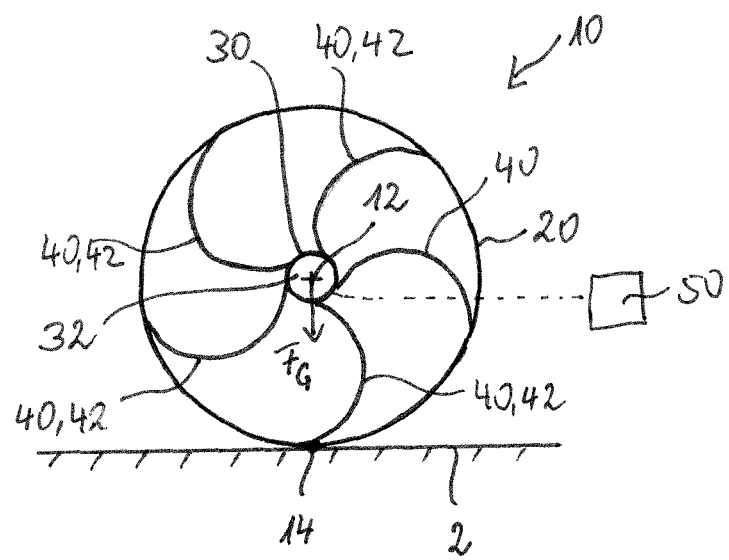
FIG. 1 shows a first embodiment of a wheel according to the invention in a rest position.
Figure 2:
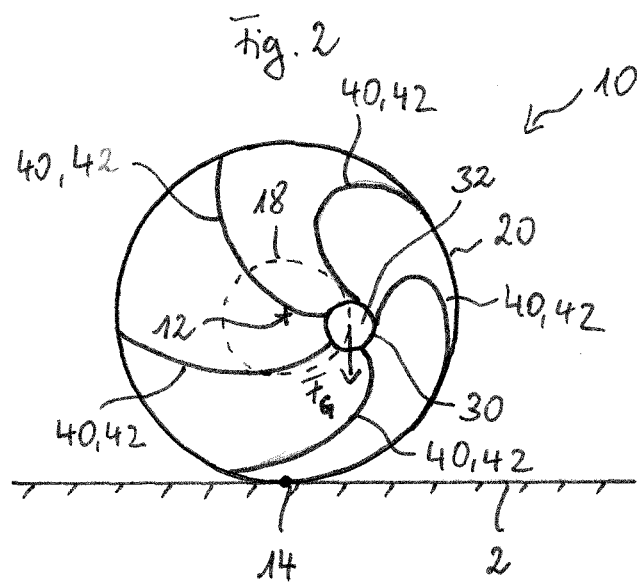
FIG. 2 shows the wheel from FIG. 1 in a drive position.

A first embodiment of a wheel 10 according to the invention is shown in FIGS. 1 and 2. Here, FIG. 1 shows the wheel 10 in a rest position, and FIG. 2 shows the wheel in a drive position. The wheel 10 comprises an outer wheel ring 20, for example a wheel rim, which may be equipped with a tire. The wheel ring 20 is of circular form and is preferably rigid. The wheel 10 is illustrated on a ground surface 2, and makes contact with the ground surface 2 at a ground contact point 14. In the interior of the wheel 10 there is situated a hub 30 with a bore 32 formed therein for receiving a shaft or axle. The shaft or axle may be coupled rotationally conjointly to the hub 30 or may be received rotatably in said hub. A support device 40 extends between the hub 30 and the wheel ring 20, which support device, in the embodiment illustrated, has multiple, in particular five, individual support elements 42. The support elements 42 are in the form of sickle-shaped spokes and extend in arcuate fashion from an outer circumference of the hub 30 to an inner circumference of the wheel ring 20. Alternatively, it is also possible for some other number of support elements 42 to be provided. The support elements 42 may also, in an axial direction, be arranged offset with respect to one another or in multiple rows or planes.

The geometrical central point of the wheel 10, in particular of the wheel ring 20, is denoted by the reference designation 12. A weight force is exerted on the wheel 10 by an axle or shaft arranged in the hub 30, which weight force is directed vertically downward from the center of the hub 30. The weight force is denoted by $F_G$.

In the position shown in FIG. 2, the hub 30 has been actively deflected out of the center of the wheel 10, that is to say out of the geometrical center 12, by the support elements 42. In this way, the weight force $F_G$ no longer acts in the direction of the ground contact point 14, but rather forms a lever force which drives the wheel 10 in a rolling movement toward the right. In order to drive the wheel 10 continuously, it is provided according to the invention that the hub 30 is actively moved by way of the support elements 40 such that a corresponding lever force is maintained continuously. The hub 30 is thus actively movable within the wheel ring 20 so as to describe a ring-shaped or circular path relative to the wheel ring 20. The orbital, ring-shaped or circular path is, in FIG. 2, illustrated by way of a dash-dotted line and denoted by the reference designation 18.

In the embodiment as per FIGS. 1 and 2, the active displacement of the hub 30 relative to the wheel ring 20 is realized by active manipulation of the individual support elements 42 of the support device 40 by virtue of the preload and/or elasticity of the individual support elements 42 being varied. This may be effected for example by virtue of the support elements 42 being coated on both sides with a piezoceramic, such that the preload can be increased or decreased in a manner dependent on an applied electrical voltage. The control of the preload is realized by way of a control device 50, which is merely schematically indicated in FIG. 1.

The wheel 10 illustrated in FIGS. 3 and 4 substantially corresponds to the wheel 10 as per FIGS. 1 and 2. Reference is thus made to the description relating to FIGS. 1 and 2. By contrast to said figures, the support elements 42 are in the form of telescopable spokes which can be actively retracted and extended. For this purpose, the support elements 42 are designed as stroke-performing cylinders, and comprise a cylinder 44 in which there is guided a piston 46 with a piston rod. The stroke-performing cylinder, for example a pneumatic or hydraulic cylinder, is pivotably mounted on the hub 30 and/or on the wheel ring 20. The operating medium is preferably supplied from the inside, that is to say via the hub 30. The stroke-performing cylinder constitutes one example of an adjustment device 48 according to the invention for adjusting the length of the support elements 42 between hub 30 and wheel ring 20.

FIG. 4 shows the wheel 10, correspondingly to FIG. 2, in a drive position in which a torque is exerted on the wheel 10. The hub 30 has been deflected out of the geometrical center 12 by way of a corresponding adjustment of the individual support elements 42. The weight force $F_G$ does not point toward the ground contact point 14, such that a torque is exerted on the wheel 10.

FIG. 5 shows a further embodiment of a wheel 10 according to the invention. By contrast to the embodiments as per FIGS. 1 to 4, the wheel ring 20 is of deformable design, such that the outer contour of the wheel 10 can be deformed for example into an oval or elliptical shape. The support device 40 with support elements 42, which is not illustrated in FIG. 5, may for example be designed analogously to the embodiments as per FIGS. 1 to 4. By way of the deformation of the outer wheel ring 20, it is possible for the hub 30, even though it may be arranged in the geometrical center of the wheel 10 or wheel ring 20, to be displaced in the direction of travel, such that the weight force is not directed toward the ground contact point 14. For this purpose, the outer wheel ring 20 is stretched in a direction oblique with respect to the vertical, this being realized by way of the support elements 42.

The invention thus provides a wheel and a drive concept for a wheel, which enable a wheel to be driven in rotation by way of active adjustment of the hub relative to the wheel ring and/or deformation of the wheel ring. By way of the wheel according to the invention, it is possible to dispense with, for example, an electric motor or an internal combustion engine for driving the wheel. The drive is realized by virtue of a varying force being exerted by support elements arranged between the hub and the wheel ring, such that, by way of a force acting on the hub, a lever is generated and a torque is effected.

LIST OF REFERENCE DESIGNATIONS

2 Ground surface
10 Wheel
12 Geometrical center
14 Ground contact point
18 Orbital path
20 Wheel ring
30 Hub
32 Bore
40 Support device
42 Support element
44 Cylinder
46 Piston
48 Adjustment device
50 Control device

The invention claimed is:

1. A wheel, comprising: an outer wheel ring; a hub; at least one support device supporting the outer wheel ring on the hub; and an adjustment device configured to adjust the hub relative to the outer wheel ring; wherein the support device has multiple support elements which extend between the hub and the wheel ring; and wherein the support elements are arranged three-dimensionally such that the hub can be adjusted in five degrees of freedom relative to the outer wheel ring.

2. The wheel as claimed in claim 1, wherein the adjustment device is configured to deflect the hub in different directions out of a geometrical center of the wheel.

3. The wheel as defined in claim 2, wherein the adjustment device is configured to continuously deflect the hub.

4. The wheel as claimed in claim 2, wherein the adjustment device is configured to move the hub along an orbital path about a geometrical center of the outer wheel ring.

5. The wheel as claimed in claim 4, wherein the adjustment device is configured to vary the length of the support elements between the hub and the wheel ring.

6. The wheel as claimed in claim 5, wherein the adjustment device comprises a telescopic device.

7. The wheel as claimed in claim 6, wherein the adjustment device is at least one of electromechanically, hydraulically, and pneumatically operated.

8. The wheel as claimed in claim 7, wherein the adjustment device is configured to adjust at least one of an elasticity and a preload of the support elements independently of one another.

9. The wheel as claimed in claim 8, wherein the adjustment device is configured to adjust the position of the hub while maintaining the shape of the wheel ring, and wherein the wheel ring is in the form of a dimensionally stable or rigid ring.

10. The wheel as claimed in claim 8, wherein the adjustment device is configured to deform the outer wheel ring during the rotation of the wheel.

11. The wheel as claimed in claim 10, wherein the adjustment device is configured to continuously deform the outer wheel ring.

12. The wheel as claimed in claim 10, wherein a control device is configured such that the adjustment device may be actuated to drive a wheel in rotation.

13. The wheel as claimed in claim 12, wherein the adjustment device is configured to exert at least one of a drive torque and a recuperation action on the outer wheel ring.

14. The wheel as claimed in claim 1, wherein the adjustment device is configured to move the hub along an orbital path about a geometrical center of the outer wheel ring.

15. The wheel as claimed in claim 1, wherein the adjustment device is configured to vary the length of the support elements between the hub and the wheel ring.

16. The wheel as claimed in claim 1, wherein the adjustment device comprises a telescopic device.

17. The wheel as claimed in claim 1, wherein the adjustment device is at least one of electromechanically, hydraulically, and pneumatically operated.

18. The wheel as claimed in claim 1, wherein the support device has multiple deformable support elements which extend between the hub and the wheel ring, and wherein the adjustment device is configured to adjust at least one of an elasticity and a preload of the support elements independently of one another.

19. The wheel as claimed in claim 1, wherein the adjustment device is configured to adjust the position of the hub while maintaining the shape of the wheel ring, and wherein the wheel ring is in the form of a dimensionally stable or rigid ring.

20. The wheel as claimed in claim 1, wherein the adjustment device is configured to deform the outer wheel ring during the rotation of the wheel.

21. The wheel as claimed in claim 1, wherein a control device is configured such that the adjustment device may be actuated to drive a wheel in rotation.

22. A method for driving the wheel as claimed in claim 1, in rotation, comprising: driving the wheel in rotation by adjusting the hub relative to the outer wheel ring, wherein the hub is adjustable in five degrees of freedom relative to the outer wheel ring.

* * * * *